United States Patent
Brok et al.

(10) Patent No.: US 12,097,838 B2
(45) Date of Patent: Sep. 24, 2024

(54) BRAKING SYSTEM FOR AN AUTONOMOUS VEHICLE

(71) Applicant: AUDI AG, Ingolstadt (DE)

(72) Inventors: Tobias Brok, Kösching (DE); Simone Macorig, Oelde (DE)

(73) Assignee: AUDI AG, Ingolstadt (DE)

( * ) Notice: Subject to any disclaimer, the term of this patent is extended or adjusted under 35 U.S.C. 154(b) by 340 days.

(21) Appl. No.: 17/672,911

(22) Filed: Feb. 16, 2022

(65) Prior Publication Data

US 2022/0314946 A1    Oct. 6, 2022

(30) Foreign Application Priority Data

Apr. 6, 2021    (DE) .......................... 102021108523.3

(51) Int. Cl.
*B60T 13/74*    (2006.01)
*B60T 7/12*    (2006.01)
(Continued)

(52) U.S. Cl.
CPC ............... *B60T 8/885* (2013.01); *B60T 7/12* (2013.01); *B60T 8/94* (2013.01); *B60T 13/588* (2013.01);
(Continued)

(58) Field of Classification Search
CPC ... B60T 7/042; B60T 7/12; B60T 8/94; B60T 8/885; B60T 8/4081; B60T 13/686;
(Continued)

(56) References Cited

U.S. PATENT DOCUMENTS

2007/0188018 A1* 8/2007 Reuter ................. B60T 8/4081
                                                 303/114.1
2008/0296106 A1* 12/2008 Nilsson ................... B60T 8/345
                                                 701/115
(Continued)

FOREIGN PATENT DOCUMENTS

CN    102164792 A    8/2011
CN    107278191 A    10/2017
(Continued)

OTHER PUBLICATIONS

Extended European Search Report issued on Jul. 13, 2022 in corresponding European Patent Application No. 22154992.6. (14 pages with machine translation).
(Continued)

*Primary Examiner* — Christopher P Schwartz
(74) *Attorney, Agent, or Firm* — Maier & Maier, PLLC

(57) ABSTRACT

A braking system in an at least partially autonomous vehicle, having one vehicle wheel brake per vehicle wheel and having a primary brake regulation system and a redundant secondary brake regulation system. One hydraulic actuator for actuating the vehicle brake is provided per vehicle wheel in a first vehicle axle which actuator is assigned to both the primary brake regulation system and also the secondary brake regulation system. One electromechanical primary actuator per vehicle wheel is assigned to the primary brake regulation system in the second vehicle axle and one electromechanical secondary actuator is assigned to the secondary brake regulation system.

20 Claims, 1 Drawing Sheet

(51) Int. Cl.
    *B60T 8/88*             (2006.01)
    *B60T 8/94*             (2006.01)
    *B60T 13/58*           (2006.01)
    B60T 7/04             (2006.01)
    B60T 8/40             (2006.01)

(52) U.S. Cl.
    CPC .............. *B60T 7/042* (2013.01); *B60T 8/4081* (2013.01); *B60T 2240/00* (2013.01); *B60T 2270/402* (2013.01); *B60T 2270/403* (2013.01); *B60T 2270/404* (2013.01); *B60T 2270/413* (2013.01); *B60T 2270/82* (2013.01)

(58) Field of Classification Search
    CPC ........... B60T 2270/82; B60T 2270/402; B60T 2270/403; B60T 2270/404; B60T 2270/413; B60T 13/588; B60T 2240/00
    See application file for complete search history.

(56) References Cited

U.S. PATENT DOCUMENTS

| | | | | |
|---|---|---|---|---|
| 2009/0223752 | A1* | 9/2009 | Kim | F16D 65/18 188/72.1 |
| 2010/0198473 | A1* | 8/2010 | Strengert | B60T 17/221 701/70 |
| 2016/0325719 | A1* | 11/2016 | Linhoff | B60T 8/4872 |
| 2018/0215368 | A1* | 8/2018 | Isono | B60T 13/741 |
| 2019/0031165 | A1* | 1/2019 | Besier | B60T 8/348 |
| 2019/0054909 | A1* | 2/2019 | Shah | B60T 8/00 |
| 2020/0055506 | A1* | 2/2020 | Michels | F16D 65/18 |
| 2020/0406869 | A1* | 12/2020 | Hwang | B60T 17/22 |

FOREIGN PATENT DOCUMENTS

| | | | |
|---|---|---|---|
| DE | 4225080 A1 | 2/1993 | |
| DE | 102005037382 A1 | 2/2007 | |
| DE | 102008041760 A1 | 12/2009 | |
| DE | 102011103540 A1 | 12/2011 | |
| DE | 102011103541 A1 | 12/2011 | |
| DE | 102013217954 A1 * | 3/2015 | ........... B60T 8/4081 |
| DE | 102016206758 A1 | 10/2017 | |
| DE | 102016012617 A1 | 4/2018 | |
| DE | 102017204157 A1 | 9/2018 | |
| DE | 102018133189 A1 | 6/2020 | |
| DE | 102018133223 A1 | 6/2020 | |
| DE | 102018222313 A1 | 6/2020 | |
| DE | 102020202477 A1 | 8/2021 | |
| EP | 2065271 B1 | 4/2013 | |
| WO | 2019/058204 A1 | 3/2019 | |

OTHER PUBLICATIONS

German Search Report issued on Dec. 9, 2021 in corresponding German Patent Application No. 10 2021 108 523.3 (8 pages with machine translation).

Office Action issued on Mar. 13, 2024, in corresponding Chinese Application No. 202210356410.4, 19 pages.

\* cited by examiner

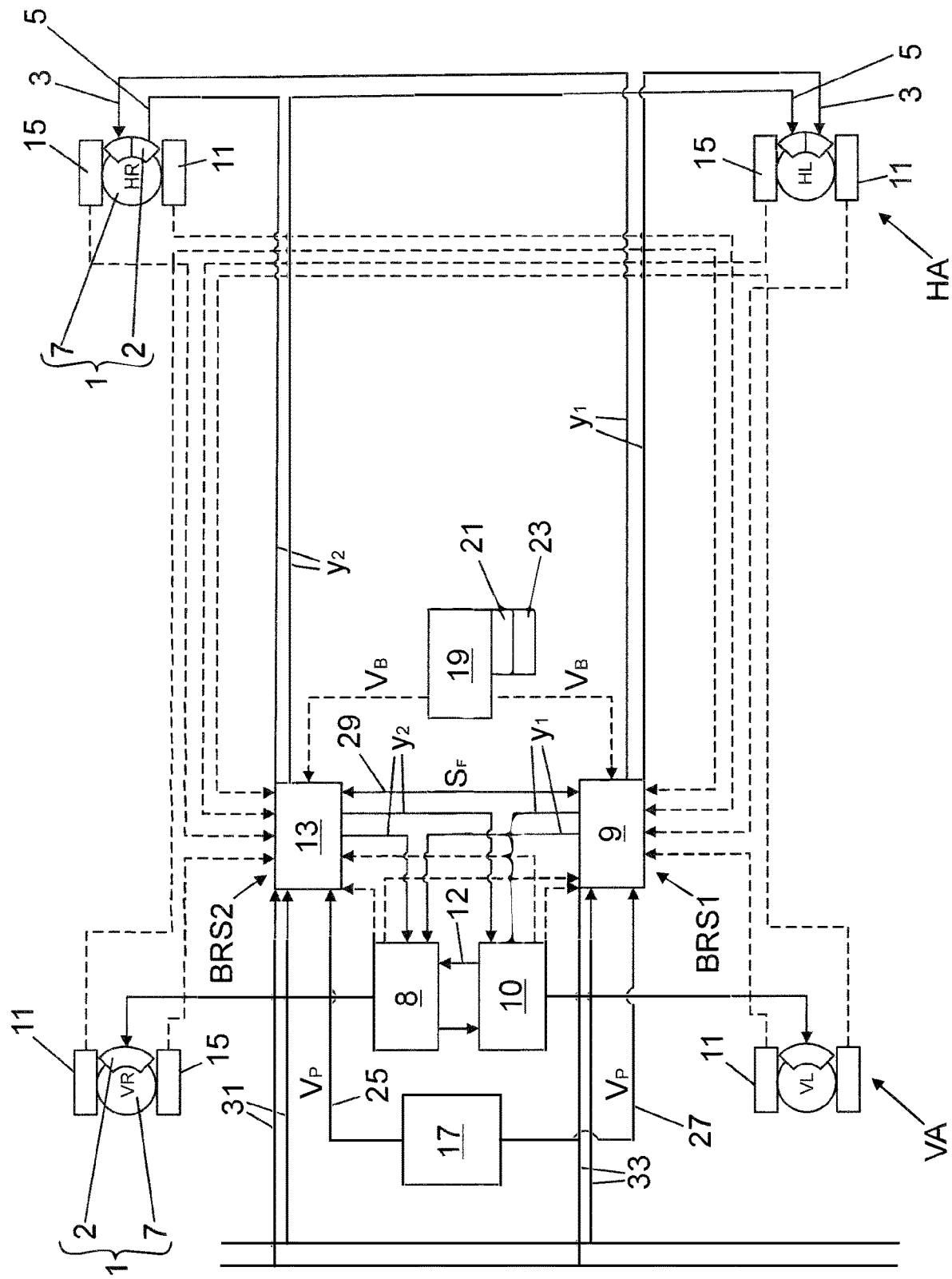

ously in a signal connection with the two brake regulation systems. According to the invention, one electromechanical, that is to say operating free of hydraulics, primary actuator and one

BRAKING SYSTEM FOR AN AUTONOMOUS VEHICLE

FIELD

The invention relates to a braking system in an at least partially autonomous vehicle.

BACKGROUND

In an at least partially autonomous vehicle, the braking system has to be designed for autonomous brake pressure buildup and for autonomous driver assistance regulation (for example, ABS or ESP functions). Depending on the design of the system, the braking system has to perform both braking and also steering tasks in case of error and bring the vehicle safely to a standstill automatically and keep it at a standstill. For this purpose, the braking system is equipped with a primary brake regulation system and a redundant secondary brake regulation system.

In a generic braking system, one hydraulic actuator per vehicle wheel for actuating the vehicle brake is provided on a first vehicle axle, in particular a front axle. Each of the hydraulic actuators is assigned to both the primary brake regulation system and also the secondary brake regulation system.

In the prior art, the secondary brake regulation system is equipped with a reduced functionality in comparison to the primary brake regulation system. Therefore, in case of error in the braking system, the use of highly automated driving functions is only enabled in, for example, driving conditions which are not very demanding with respect to lateral dynamics. The use on freeway sections is thus possible. However, restrictions are given by the curve radius of freeways, which has to be as large as possible, or by good roadway conditions. The functions with respect to the maximum speed are also restricted. The maximum speed of automated driving of level 3 or 4 is 130 km/h during normal operation. In contrast, the maximum speed is presently limited to 80 km/h during use of the secondary braking regulation system. Moreover, in current vehicles, the parking brake function is integrated into the transmission structure of the vehicle in a manner using simple components.

A method for controlling a regenerative and hydraulic brake is known from DE 10 2011 103 541 A1. A method for operating a brake regulation system is known from DE 10 2005 037 382 A1. A method for controlling a regenerative and hydraulic brake is known from DE 10 2011 103 540 A1.

SUMMARY

The object of the invention is to provide a braking system in an at least partially autonomous vehicle, the secondary brake regulation system of which has increased functionality in comparison to the prior art.

The invention is directed to a braking system in an at least partially autonomous vehicle, which has one vehicle wheel brake per vehicle wheel as well as a primary brake regulation system and a redundant secondary brake regulation system. One hydraulic actuator per vehicle wheel for actuating the vehicle brake is provided on a first vehicle axle, in particular the front axle. Each hydraulic actuator is assigned to both the primary brake regulation system and also the secondary brake regulation system, that is to say in a signal connection with the two brake regulation systems. According to the invention, one electromechanical, that is to say operating free of hydraulics, primary actuator and one electromechanical secondary actuator per vehicle wheel are provided on the other vehicle axle, in particular the rear axle. The primary actuator is assigned to the primary brake regulation system, while the secondary actuator is assigned to the secondary brake regulation system.

The invention therefore generally relates to the structure of a hybrid system topology as a braking system, in which one vehicle axle (in particular the front axle) is braked in a wet manner (that is to say using hydraulic components), whereas the other vehicle axle (in particular the rear axle) is braked in a dry manner by means of electromechanical brakes.

The driver braking intention can be detected via a foot pedal simulator unit. In this case, a hydraulic fallback level is not provided. The driver is therefore entirely decoupled from the braking system and is not part of the fallback level. The electrical signals of the foot pedal simulator can be sent to both the primary control unit and also the secondary control unit. These control units process the signal and activate the actuators. The electrical supply of the control units can be ensured via a redundant vehicle electrical system and redundant wiring.

The activation of the actuators can also be secured via branched wiring. One control unit can thus be connected to an electromechanical actuator on a wheel of the rear axle in each case. One control unit is connected in each case via a cable to transmit a working current to the hydraulic actuators for the pressure buildup on the front axle. The detection of the driving situation is also redundant in this system topology. The signal which the speed sensors ascertain on a wheel is transmitted to both the primary control unit and also the secondary control unit. A redundant signal transmission is provided in this way. Furthermore, the control units can be connected via redundant bus lines to the information network, which also has a double embodiment of the bus system. Finally, the control units can be networked with one another via a double bus line.

In one preferred embodiment variant, the vehicle front axle of the system can be braked in a wet manner (that is to say by means of hydraulic actuators). Two hydraulic actuators are integrated for this purpose on the vehicle front axle, which are designed, for example, as pumps. One hydraulic actuator is connected in each case via a brake pressure line to a brake caliper on the front axle. The two hydraulic actuators can also be connected to one another via two brake pressure lines. A simple hydraulic circuit is integrated inside the actuator system. In the event of failure of one hydraulic actuator, the other still functional hydraulic actuator can take over the braking and/or steering tasks on the vehicle axle with the aid of the hydraulic circuit.

A significantly higher-performance fallback level in comparison to the prior art can be achieved by the structure according to the invention of a hybrid braking system. The networking of the system components also enables the lateral stabilization of the vehicle in the event of understeering in case of an error. The improved dynamics overall enable a higher deceleration in case of error. Moreover, a parking brake (for example integrated into a gearshift transmission) can be omitted. In place of this, the parking brake function can be taken over by the electromechanical actuators.

One preferred technical embodiment of the invention is described hereinafter, in which the hydraulic actuators are integrated into the vehicle front axle. However, the invention is not restricted to this embodiment. In place of this, the hydraulic actuators can also be integrated into the vehicle rear axle, while the electromechanical actuators are integrated into the vehicle front axle: In the technical embodiment, the primary brake regulation system of the hybrid system topology can use the signal input of the foot pedal simulator unit for processing the driver braking intention. For this purpose, a pressure sensor and a distance sensor can be integrated into the foot pedal simulator unit for signal generation. The primary and secondary control units can mutually process this signal in the normal case. The activation of the actuators also takes place simultaneously via the primary control unit and via the secondary control unit. One control unit in each case can activate two electromechanical actuators on the rear axle. The hydraulic actuators for the front axle can each be activated by one control unit.

Due to the structure according to the invention of the system topology, the degree of freedom is also provided that only one control unit activates the hydraulic actuators for the front axle. In this way, the vehicle can be prevented from going askew due to different latency times of the transmission of an activation of the control units and a differing brake pressure buildup thus resulting on the wheels of the front axle.

The brake pressure regulation is achieved on the front axle via driving the pump motor forward and backward. The clamping force of the brake caliper is reduced by a decreasing brake pressure in the brake pressure lines. To build up the pressure again, the pump motor is driven forward again. The clamping force is generated directly at the wheel by the electromechanical actuators on the rear axle. The brake force regulation is achieved via the same mechanism. However, brake fluid is not used as a medium for this purpose.

The use of an electromechanical brake necessarily requires the use of a floating caliper as the carrier of the unit. The brake lining is pressed onto the brake disk by the extension of the spindle of the electric motor. On the opposite side of the brake caliper, the brake lining is pressed with the same clamping force onto the brake disk due to the structural form of the floating caliper.

The secondary brake regulation system is secured by a double embodiment of system components. The primary control unit and secondary control unit can preferably have the same functions. The design of the electromechanical pump motors of the front axle and the electromechanical actuators of the rear axle is conceived in the same way. The redundancy is secured via a second component having the same functions. In the event of failure of one system component, a second system component is present which takes over its functions. In the event of a failure of the primary control unit, the secondary control unit is thus activated. Due to the redundant wiring, it is supplied with the same items of information and sufficient electrical energy. The secondary control unit has the option of independently carrying out the activation of the pump motors on the front axle due to the double networking. The remaining 50% of the electromechanical actuators on the rear axle, which are already activated by the secondary control unit in case of operation, are sufficient to guarantee a secure deceleration of the entire vehicle in case of error. In the event of failure of one electromechanical actuator on the rear axle, due to the degrees of freedom of the system topology, an adaptation of the brake force can be carried out, for example, the deactivation of an electromechanical actuator on the opposite side, so that the vehicle can still securely decelerate. This function is technically implementable by means of software adaptation of the control units or relays.

In the event of a failure of one pump motor, a normally open switching valve can switch internally, so that one pump motor supplies both wheel brakes of the front axle with brake pressure in case of error. In principle, a wheel-individual brake pressure regulation can be implemented in case of error of all components, except for a failure of one pump motor. In the event of a failure of one pump motor, a wheel-individual setting of the brake pressure and thus the brake force on the front axle is not possible. In the event of oversteering of the vehicle, lateral stabilization cannot be ensured, since the wheel brakes of the front axle cannot be braked individually by wheel. A longitudinal stabilization is still possible.

A holding function can be carried out, on the one hand, via holding the position of the pump motor. On the other hand, an additional holding force can be applied via a constant power supply of the electromechanical actuators on the rear axle. The parking is implemented by means of a safety catch in the electromechanical actuators of the rear axle. In one preferred embodiment variant, a total of four actuators having four safety catches can be installed, which can perform the blocking function. In this way, a transmission of the parking force to two wheels is always guaranteed. Sufficient redundancy is therefore provided.

Essential aspects of the invention are described once again in detail hereinafter: The primary control unit and the secondary control unit can thus be implemented to be structurally equivalent and functionally equivalent. In the same way, the primary actuators and the secondary actuators can also be implemented to be structurally equivalent and functionally equivalent.

In one technical embodiment, the primary brake regulation system can have a primary control unit. The primary control unit can generate primary positioning signals, using which the hydraulic actuators and the electromechanical primary actuators are activatable, on the basis of a setpoint deceleration specification generated in a pilot system and/or a setpoint deceleration specification generated on the part of the driver by means of a brake pedal. Alternatively and/or additionally, the secondary brake regulation system can have a secondary control unit. On the basis of a setpoint deceleration specification generated in the pilot system and/or a setpoint deceleration specification generated on the part of the driver by means of the brake pedal, the secondary control unit can generate secondary positioning signals, using which the hydraulic actuators and the electromechanical secondary actuators are activatable.

To increase the process reliability, the two hydraulic actuators can be connected to one another via a hydraulic circuit. With the aid of the hydraulic circuit, in the event of failure of one hydraulic actuator, the other, still functional hydraulic actuator can take over the braking and/or steering tasks for both vehicle wheel brakes of the vehicle axle.

The brake pedal can preferably be a component of a foot pedal simulator unit having at least one pedal sensor. The foot pedal simulator unit can convert the mechanical pedal movement into an electrical foot pedal signal, which is the setpoint deceleration specification generated on the part of the driver.

To further increase the system reliability, it is preferred if a primary vehicle electrical system and a redundant secondary vehicle electrical system are provided. These can each supply the primary control unit and the secondary control unit with electrical energy independently of one another.

In one technical embodiment, a primary speed sensor and a secondary speed sensor can be assigned to each vehicle wheel. The primary speed sensor has a signal connection to the primary control unit. In the same way, the secondary speed sensor has a signal connection to the secondary control unit.

It is preferred if the pilot system has a signal connection via a primary signal line to the primary control unit. Independently thereof, the pilot system can have a signal connection via a further secondary signal line to the secondary control unit.

In a first embodiment variant, solely the primary brake regulation system can be in use in normal driving operation, while the secondary brake regulation system is deactivated. The primary control unit can preferably be connected via a connecting signal line to the secondary control unit. Items of status information can be exchanged between the two control units via the connecting signal line. If a case of error in the primary brake regulation system is diagnosed in the primary control unit, an error signal is generated, using which the secondary control unit is activatable via the connecting signal line. In this case, the secondary brake regulation system, in place of the primary brake regulation system, takes over the implementation of the setpoint deceleration specification.

In an alternative operating mode, both the primary brake regulation system and also the secondary brake regulation system can already be in use in normal driving operation. In this case, the two brake regulation systems therefore operate in parallel operation already in normal driving operation.

In one refinement of the invention, at least one of the electromechanical primary actuators and at least one of the electromechanical secondary actuators can each have a blocking function, by means of which, in a parking situation, the actuator blocks the assigned vehicle wheel by brake actuation. All electromechanical actuators are preferably equipped with such a blocking function.

BRIEF DESCRIPTION OF THE FIGURE

An exemplary embodiment of the invention is described hereinafter on the basis of the FIGURE.

DETAILED DESCRIPTION

A schematic block circuit diagram of the braking system of a two-track autonomous vehicle having a front axle VA and a rear axle HA is shown in the FIGURE. Accordingly one vehicle wheel brake 1 is assigned to each of the two front wheels VL, VR and each of the two rear wheels HR, HL. Each of the vehicle wheel brakes 1 has a brake caliper 2, which interacts with a brake disk 7 of the vehicle wheel brake 1. A hydraulic actuator 8, 10 is assigned to each of the two vehicle wheel brakes 1 of the front axle VA.

In contrast, an electromechanical primary actuator 3, that is to say which operates without hydraulics, and an electromechanical secondary actuator 5 is assigned to each rear wheel on the rear axle HA. The primary actuator 3 is a component of a primary brake regulation system BRS1, while the secondary actuator 5 is a component of a secondary brake regulation system BRS2.

The primary brake regulation system BRS1 is constructed in the FIGURE from a primary control unit 9 and the total of two electromechanical primary actuators 3 on the rear axle HA, which are each assigned to one vehicle wheel brake 1. Moreover, the primary control unit 9 has a signal connection to a primary speed sensor 11 for each vehicle wheel VL, VR, HR, HL. Furthermore, the primary control unit 9 has a signal connection to the two hydraulic actuators 8, 10 of the vehicle front axle VA.

The redundant secondary brake regulation system BRS2 has structurally equivalent components to the primary brake regulation system BRS1. Accordingly, the secondary brake regulation system BRS2 is constructed from a secondary control unit 13 and the total of two electromechanical secondary actuators 5 on the rear axle HA. The secondary control unit 13 moreover has a signal connection to secondary speed sensors 15, which are provided at each vehicle wheel. Furthermore, the secondary control unit 13 also has a signal connection to the two hydraulic actuators 8, 10 of the vehicle front axle VA.

Each of the hydraulic actuators 8, 10 can have, for example, an electrically operated hydraulic pump activatable by the control unit 9, 13. This pump is connected on the pressure side via a brake pressure line to a hydraulic cylinder, using which the brake caliper 2 of the vehicle wheel brake 1 can be brought into pressure contact with the brake disk 7 of the vehicle wheel brake 1. To control the brake pressure, a hydraulic control valve can be arranged in the brake pressure line, which is activatable using the respective control unit 9, 13.

In normal driving operation, primary positioning signals $y_1$ are generated in the primary control unit 9 on the basis of a setpoint deceleration specification $V_P$ generated in a pilot system 17 (for example, a driver assistance system having ABS and EPS functions) and/or a setpoint deceleration specification $V_B$ generated on the part of the driver by means of a brake pedal 19. With the aid of the primary positioning signals $y_1$, the respective electromechanical primary actuators 3 of the rear axle HA and the two hydraulic actuators 8, 10 of the front axle VA can be activated to perform diverse braking or steering tasks.

The primary control unit 9 and the secondary control unit 13 are each supplied with electrical energy independently of one another by a primary vehicle electrical system 31 and a redundant secondary vehicle electrical system 33.

In the FIGURE, the brake pedal 19 is a component of a foot pedal simulator unit having a pressure sensor 21 and a distance sensor 23. The foot pedal simulator unit converts the pedal movement detected by the two sensors 21, 23 into an electrical foot pedal signal which corresponds to the setpoint deceleration specification $V_B$ generated on the part of the driver.

In the FIGURE, the pilot system 17 moreover has a signal connection to the primary control unit 9 using a primary signal line 25, while the pilot system 17 has a signal connection to the secondary control unit 13 via a secondary signal line 27 independently thereof. In addition, the two control units 9, 13 are connected to one another by means of a connecting signal line 29. Items of status information can be exchanged between the two control units 9, 13 via the connecting signal line 29.

In normal driving operation, only the primary brake regulation system BRS1 is used in the illustrated embodiment variant, while the redundant secondary brake regulation system BRS2 is deactivated. If a diagnostic module in the primary control unit 9 detects a case of error in the primary brake regulation system BRS1, an error signal $S_F$ is generated, which is read out by the primary control unit 9 via the connecting signal line 29 in the secondary control unit 13. The secondary brake regulation system BRS2 thereupon takes over the implementation of the setpoint deceleration specifications $V_P$, $V_B$.

Alternatively thereto, both the primary brake regulation system BRS1 and also the secondary brake regulation system BRS2 can already be in use in normal driving operation, so that both brake regulation systems operate in parallel operation.

In addition, the electromechanical primary and secondary actuators 9, 13 each have a blocking function, by which the respective actuator 3, 5 blocks the assigned vehicle wheel by brake actuation in a parking situation.

LIST OF REFERENCE SIGNS 1 vehicle wheel brake
2 brake caliper
3, 5 primary and secondary actuators
7 brake disk
8 hydraulic actuator
9 primary control unit
8 hydraulic actuator
11 primary speed sensor
12 hydraulic circuit
13 secondary control unit
15 secondary speed sensors
17 pilot system
19 brake pedal
21 pressure sensor
23 distance sensor
25 primary signal line
27 secondary signal line
29 connecting signal line
31 primary vehicle electrical system
33 secondary vehicle electrical system
$S_F$ error signal
$V_P$, $V_B$ setpoint deceleration specifications
$y_1$, $y_2$ positioning signals
BRS1 primary brake regulation system
BRS2 secondary brake regulation system
VA vehicle front axle
HA vehicle rear axle

The invention claimed is:

1. A braking system in an at least partially autonomous vehicle, comprising:
a first vehicle axle including first vehicle wheels, each first vehicle wheel being provided with a first vehicle wheel brake and a hydraulic actuator, wherein the first vehicle wheel brake is actuatable only by the hydraulic actuator;
a second vehicle axle including second vehicle wheels, each second vehicle wheel being provided with a second vehicle wheel brake, an electromechanical primary actuator, and an electromechanical secondary actuator, wherein the second vehicle wheel brake is actuatable only by the electromechanical primary actuator and/or the electromechanical secondary actuator;
a primary brake regulation system; and
a redundant secondary brake regulation system;
wherein each hydraulic actuator is assigned to both the primary brake regulation system and the secondary brake regulation system; and
wherein each electromechanical primary actuator is assigned to the primary brake regulation system, and each electromechanical secondary actuator is assigned to the secondary brake regulation system.

2. The braking system as claimed in claim 1,
wherein the primary brake regulation system has a primary control unit, wherein the primary control unit generates primary positioning signals on the basis of a first setpoint deceleration specification that is generated in a pilot system and/or a second setpoint deceleration specification that is generated on the part of the driver by a brake pedal, the hydraulic actuators and the electromechanical primary actuators being activatable using the primary positioning signals,
wherein the secondary brake regulation system has a secondary control unit, wherein the secondary control unit generates secondary positioning signals on the basis of the first setpoint deceleration specification that is generated in the pilot system and/or the second setpoint deceleration specification that is generated on the part of the driver by the brake pedal, the hydraulic actuators and the electromechanical secondary actuators being activatable using the secondary positioning signals.

3. The braking system as claimed in claim 2, wherein the pilot system has a signal connection to the primary control unit via a primary signal line, and the pilot system has a signal connection to the secondary control unit via a secondary signal line independent thereof.

4. The braking system as claimed in claim 2, wherein a connecting signal line connects the primary control unit and the secondary control unit, via which items of status information are exchangeable between the control units, and in case of error in the primary brake regulation system, the primary control unit generates an error signal, using which the secondary control unit is activatable via the connecting signal line, so that in place of the primary brake regulation system, the secondary brake regulation system takes over the implementation of the setpoint deceleration specification.

5. The braking system as claimed in claim 2, wherein two hydraulic actuators are connected to one another via a hydraulic circuit, by which, in the event of failure of one hydraulic actuator, the other, still functional hydraulic actuator takes over the braking and/or steering tasks for two first vehicle wheel brakes of the first vehicle axle.

6. The braking system as claimed in claim 2, wherein the brake pedal is a component of a foot pedal simulator unit having at least one pedal sensor, and the foot pedal simulator unit converts the mechanical pedal movement into an electrical foot pedal signal, which is the setpoint deceleration specification generated on the part of the driver.

7. The braking system as claimed in claim 2, further comprising: a primary vehicle electrical system and a redundant secondary vehicle electrical system, which each supply the primary control unit and the secondary control unit with electrical energy independently of one another.

8. The braking system as claimed in claim 2, wherein each first vehicle wheel and each second vehicle wheel is assigned a primary speed sensor and a secondary speed sensor, which each have a signal connection to the primary control unit and to the secondary control unit.

9. The braking system as claimed in claim 1, wherein two hydraulic actuators are connected to one another via a hydraulic circuit, by which, in the event of failure of one hydraulic actuator, the other, still functional hydraulic actuator takes over the braking and/or steering tasks for two first vehicle wheel brakes of the first vehicle axle.

10. The braking system as claimed in claim 9, wherein the brake pedal is a component of a foot pedal simulator unit having at least one pedal sensor, and the foot pedal simulator unit converts the mechanical pedal movement into an electrical foot pedal signal, which is the setpoint deceleration specification generated on the part of the driver.

11. The braking system as claimed in claim 9, further comprising: a primary vehicle electrical system and a redundant secondary vehicle electrical system, which each supply the primary control unit and the secondary control unit with electrical energy independently of one another.

12. The braking system as claimed in claim 9, wherein each first vehicle wheel and each second vehicle wheel is assigned a primary speed sensor and a secondary speed sensor, which each have a signal connection to the primary control unit and to the secondary control unit.

13. The braking system as claimed in claim 1, wherein the brake pedal is a component of a foot pedal simulator unit having at least one pedal sensor, and the foot pedal simulator unit converts the mechanical pedal movement into an electrical foot pedal signal, which is the setpoint deceleration specification generated on the part of the driver.

14. The braking system as claimed in claim 13, further comprising: a primary vehicle electrical system and a redundant secondary vehicle electrical system, which each supply the primary control unit and the secondary control unit with electrical energy independently of one another.

15. The braking system as claimed in claim 13, wherein each first vehicle wheel and each second vehicle wheel is assigned a primary speed sensor and a secondary speed sensor, which each have a signal connection to the primary control unit and to the secondary control unit.

16. The braking system as claimed in claim 1, further comprising: a primary vehicle electrical system and a redundant secondary vehicle electrical system, which each supply the primary control unit and the secondary control unit with electrical energy independently of one another.

17. The braking system as claimed in claim 16, wherein each first vehicle wheel and each second vehicle wheel is assigned a primary speed sensor and a secondary speed sensor, which each have a signal connection to the primary control unit and to the secondary control unit.

18. The braking system as claimed in claim 1, wherein each first vehicle wheel and each second vehicle wheel is assigned a primary speed sensor and a secondary speed sensor, which each have a signal connection to the primary control unit and to the secondary control unit.

19. The braking system as claimed in claim 1, wherein in normal driving operation, both the primary brake regulation system and also the secondary brake regulation system are in use, so that both brake regulation systems operate in parallel operation.

20. The braking system as claimed in claim 1, wherein at least one of the electromechanical actuators has a blocking function, by which in a parking situation, the actuator blocks the assigned vehicle wheel by brake actuation.

\* \* \* \* \*